(12) United States Patent
Bennington

(10) Patent No.: US 10,271,649 B1
(45) Date of Patent: Apr. 30, 2019

(54) FURNITURE GLIDE AND ACTUATING MECHANISM

(71) Applicant: Robert M. Bennington, Sharpsville, PA (US)

(72) Inventor: Robert M. Bennington, Sharpsville, PA (US)

( * ) Notice: Subject to any disclaimer, the term of this patent is extended or adjusted under 35 U.S.C. 154(b) by 0 days.

(21) Appl. No.: 15/090,489

(22) Filed: Apr. 25, 2016

(51) Int. Cl.
*A47B 88/00* (2017.01)
*A47B 88/493* (2017.01)
*A47B 13/00* (2006.01)
*A47B 91/06* (2006.01)
*F16C 21/00* (2006.01)
*B60B 33/00* (2006.01)
*A47B 83/02* (2006.01)

(52) U.S. Cl.
CPC .......... *A47B 88/493* (2017.01); *A47B 13/003* (2013.01); *A47B 91/06* (2013.01); *F16C 21/00* (2013.01); *A47B 83/0215* (2017.08); *B60B 33/0026* (2013.01)

(58) Field of Classification Search
CPC ......... A47B 91/06; F16C 21/00; A45C 5/146; B60B 33/0026; B60B 33/04; B60B 33/06; B60B 33/0015; B60B 33/0049; B60B 33/0055; B60B 33/00

USPC .......... 248/346.11, 129; 16/18 R, 19, 45, 46, 16/32, 35 R, 18 CG, 33, 44
See application file for complete search history.

(56) References Cited

U.S. PATENT DOCUMENTS

| | | | | |
|---|---|---|---|---|
| 1,386,317 A | * | 8/1921 | Claassen | B60B 33/04 16/19 |
| 1,749,751 A | * | 3/1930 | Bergsten | B60B 33/06 16/44 |
| 2,524,819 A | * | 10/1950 | McKean | B60B 33/06 16/32 |
| 2,613,389 A | * | 10/1952 | Cramer | B60B 33/06 16/18 CG |
| 2,770,831 A | * | 11/1956 | Angelica | B60B 33/08 16/24 |
| 3,441,974 A | * | 5/1969 | Dean | A47B 91/028 16/18 R |
| 5,001,808 A | * | 3/1991 | Chung | B60B 33/06 16/18 CG |
| 6,473,935 B1 | * | 11/2002 | Cherukuri | B60B 33/0005 16/33 |
| 8,484,801 B2 | * | 7/2013 | Li | B60B 7/02 16/18 CG |
| 9,283,136 B2 | * | 3/2016 | Jie | A61H 3/04 |

* cited by examiner

*Primary Examiner* — Anita M King
(74) *Attorney, Agent, or Firm* — Richard K. Thomson (57) ABSTRACT

An actuating mechanism useful for retracting and extending furniture glides allows a minor lifting movement to actuate the caster/glide from a stored position to an extended, operative position. The same motion permits the caster/glide to be retracted to its stored position.

3 Claims, 8 Drawing Sheets

FURNITURE GLIDE AND ACTUATING MECHANISM

This application is based upon provisional patent appl. U.S. Ser. No. 62/141,992 filed Apr. 2, 2015, which is hereby incorporated by reference.

BACKGROUND AND SUMMARY OF THE INVENTION

The present invention is directed to the field of mechanisms. More particularly, the present invention is directed to an actuator mechanism that is particularly useful as a retractable furniture glide, locking/unlocking actuating mechanism, and the like.

The actuator mechanism of the present invention has a particularly effective application as part of a furniture glide. A massive piece of furniture such as a table, desk, filing cabinet, appliance, etc., can be transformed from an immovable object to an article that is readily moved from one place to another and then re-situated in its veritably immovable condition. This is accomplished by the slightest upward movement of the corner(s) upon which the caster(s) is/are located (as little as ¼") will actuate, and then, subsequently de-actuate, the caster.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
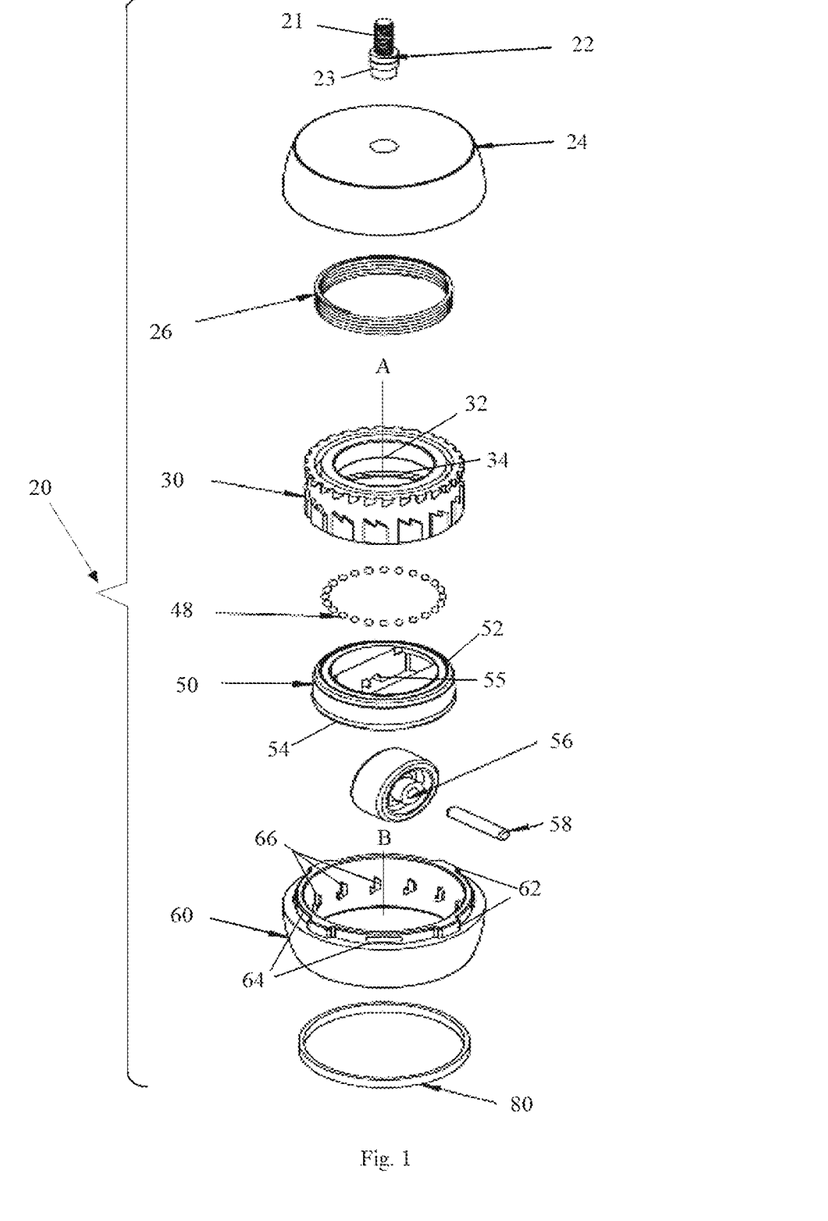
FIG. 1 is an exploded view of a first embodiment of the furniture glide of the present invention.
Figure 2:
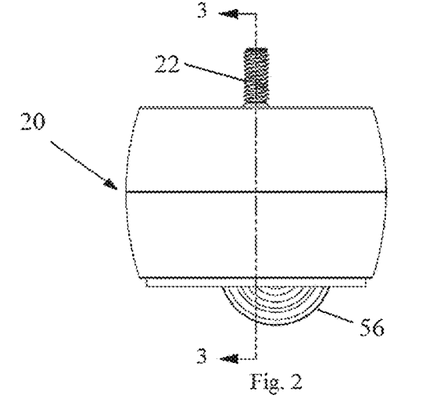
FIG. 2 is a front view of the first embodiment in an intermediate, locked position.
Figure 3:
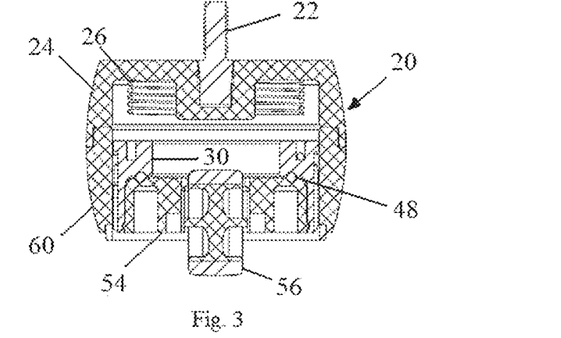
FIG. 3 is a cross-sectional side view taken along line 3-3 in FIG. 2.

A first embodiment of the furniture glide of the present invention is depicted in FIGS. 1-7 generally at 20. The elements of the first embodiment depicted in FIG. 1 include threaded stud 22, cap 24, compression spring 26, toothed rotator 30, ball bearings 48, wheel housing 50, caster wheel 56, wheel axle 58, cylindrical geared housing 60, and rubber gripping ring 80. Toothed rotator 30 is generally cylindrical and has a first longitudinal axis A. Geared housing 60 is, likewise, generally cylindrical has a second longitudinal axis B. When toothed rotator 30 is assembled with geared housing, axes A and B are coaxial. The threaded portion 21 of threaded stud 22 extends above the top of cap 24 while the lower portion 23 is retained in boss of cap 24 (FIG. 3). The inner periphery of cap 24 has recesses (not shown) which are complementarily shaped to receive protrusions 62 of geared housing 60 to align the cap 24 and housing 60. A series of circumferential ribs 64 engage similar ribs on the inner periphery of cap 24 to secure cap 24 to housing 60 via a snap fit.

Ball bearings 48 are seated in a race 52 in the upper surface of wheel housing 50. Ball bearings 48, in turn, engage a downwardly facing circumferential race 32 in toothed rotator 30. A peripheral groove 34 receives rib 54 of wheel housing 50 to retain wheel housing 50 secured within toothed rotator 30. Steel wheel axle 58 is inserted through wheel 56 and the ends thereof press fit into rounded recesses 55 of wheel housing 50. Wheel axle 58 need not turn in recesses 55 since wheel 56 rotates freely thereon. Once toothed rotator 30 is dropped into geared housing 60 from the top, the diameter of closely spaced first set of teeth 32 of rotator 30 is such that teeth 32 prevent first set of teeth 66 of the geared housing 60 from passing there between so the two elements, toothed rotator 30 and geared housing 60, remain engaged with cap 24 preventing toothed rotator 30 from being withdrawn from the top side of geared housing 60. When furniture glide 20 is in its retracted position, rubber gripping ring 80, which is secured to the bottom of geared housing 60, engages the supporting surface resisting movement. As seen in FIG. 2, the rotational axis of the caster wheel 56 is offset from the axes A and B which lie along the center line of threaded stud 22 permitting/causing the caster wheel assembly to pivot as movement of the supported article is initiated. Rubber gripper ring 80 may be adhered to the bottom of geared housing 60 and/or partially seated in a recess 81 provided in the bottom surface of geared housing 60 to reduce the chances of its becoming detached.

Figure 8A:
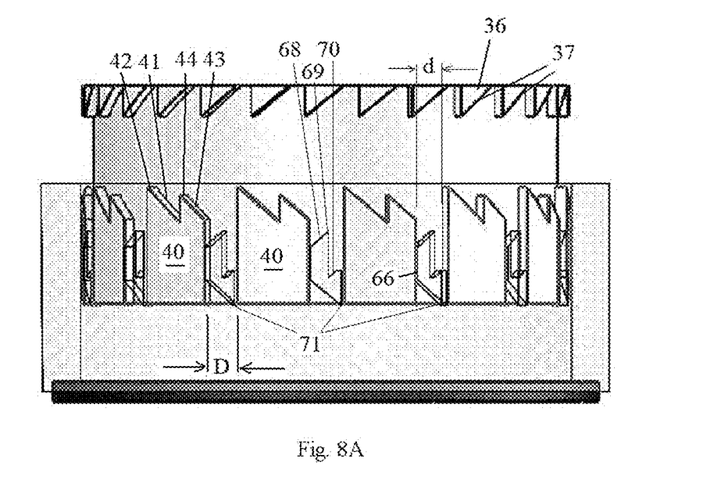
FIG. 8A is an isometric schematic of the first embodiment of the actuator mechanism in a retracted position.
Figure 8B:
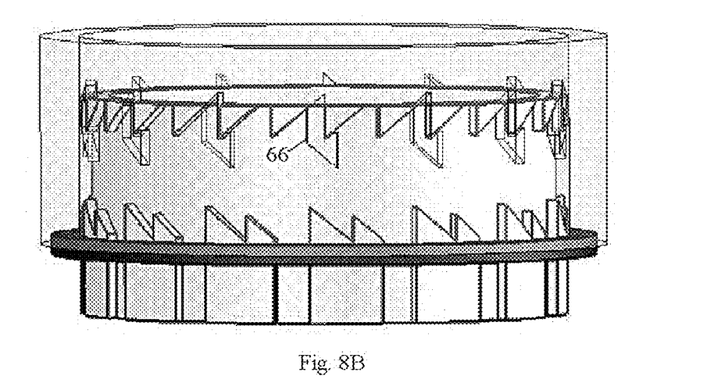
FIG. 8B is an isometric schematic of the first embodiment in a transient position.
Figure 8C:
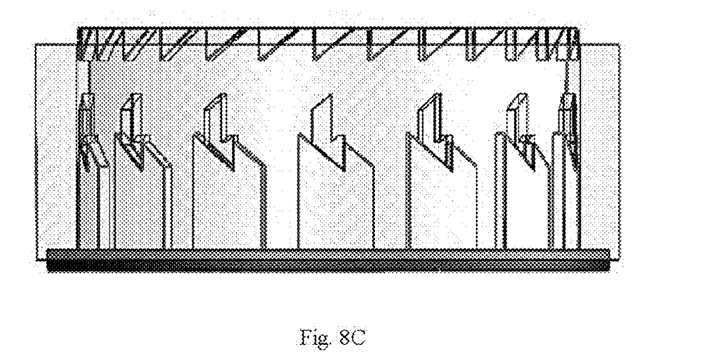
FIG. 8C is an isometric schematic of the first embodiment in an intermediate extended position.
Figure 9:
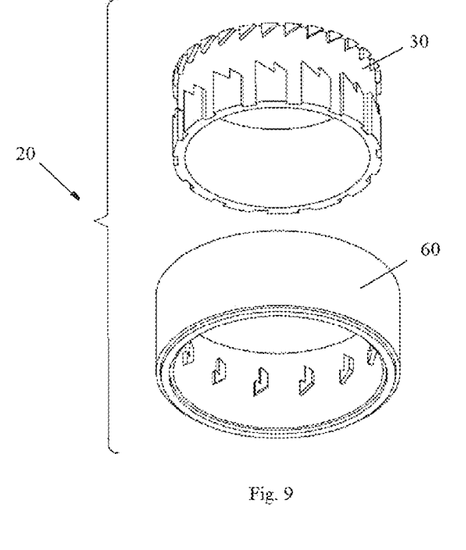
FIG. 9 is an exploded perspective view of the actuating mechanism of the present invention.
Figure 10:
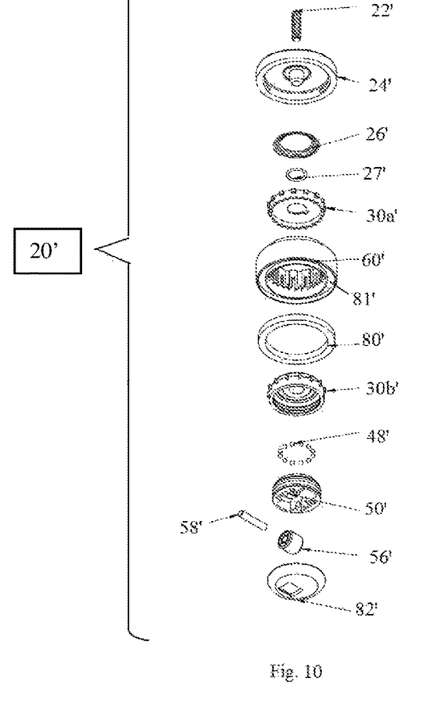
FIG. 10 is an exploded view of a second embodiment of the furniture glide of the present invention.
Figure 11:
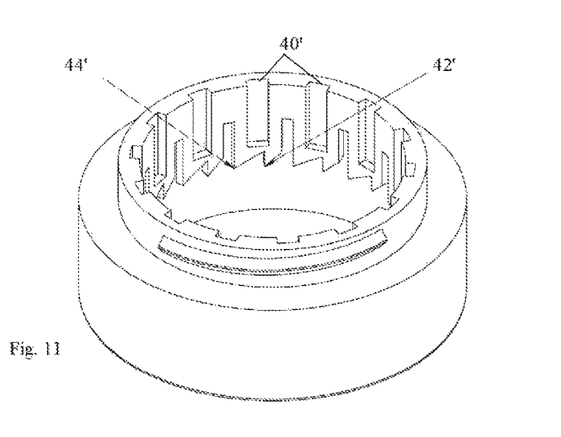
FIG. 11 is an enlarged perspective view of the geared housing of second embodiment.

The key elements of the actuator mechanism and furniture glide 20 of the present invention will be discussed in detail with respect to FIGS. 8A-8C. As seen therein, cylindrical geared housing 60 has a first axis of rotation 'B' defining a first axial direction, and a first set of teeth 66 on an inner peripheral surface thereof. First set of gear teeth 66 each have a first upper angular surface 68 sloping upwardly in a first lateral direction, a second upper angular surface 70 offset from the first angular surface defining a first series of saw teeth 69, said second angular surface sloping upwardly in the first lateral direction, and a third lower angular surface sloping downwardly in a the same first lateral direction defining a second set of saw teeth 71, each one of said first set of gear teeth having a first lateral dimension—'d'—.

Toothed rotator 30 has a second axis of rotation 'A' which is coaxial with first axis of rotation 'B'. Toothed rotator 30 is rotatable about second axis 'A' in a first rotational direction relative to geared housing 60, said first rotational direction being the same as the first direction in which the gear teeth slope. Toothed rotator 30 has i) a first set of teeth 36 along its upper outer periphery, the first set of teeth 36 having a fourth angular surface 37 facing downward and sloping upwardly in the first direction, the first set of teeth 36 comprising a third set of spaced saw teeth. In addition, toothed rotator 30 has ii) a second set of teeth 40 about its outer periphery at its equator, second set of teeth 40 having a first upper angular surface 41 sloping downwardly in the first direction defining a fourth set of saw teeth 42, a second angular surface 43 offset from first angular surface 41 defining a fifth set of saw teeth 44 and sloping downwardly in the first direction. Each member of second set of teeth 40 is spaced one from another by an amount 'D' exceeding first lateral dimension 'd' being identified as space 45.

Figure 4:
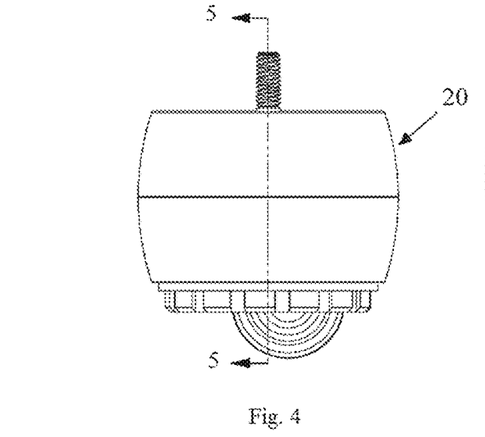
FIG. 4 is a front view of the first embodiment in an extended transient position.
Figure 5:
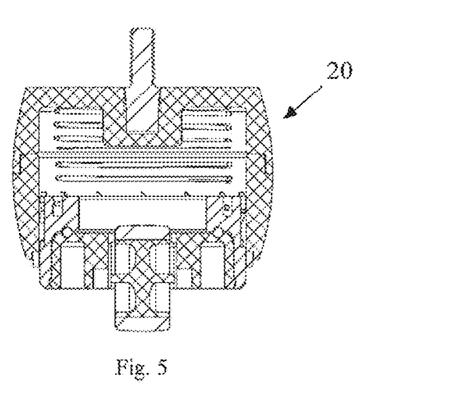
FIG. 5 is a cross-sectional side view taken along line 5-5 in FIG. 4.
Figure 6:
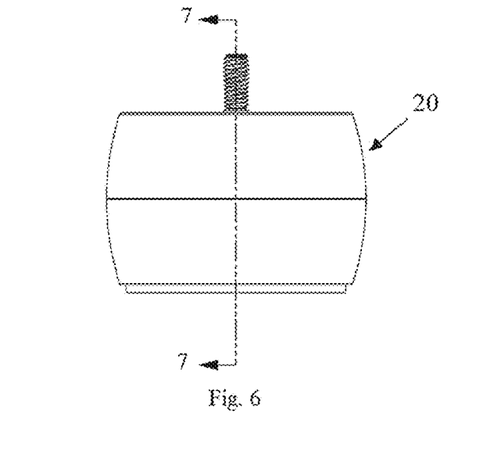
FIG. 6 is a front view of the first embodiment in a retracted, at rest position.
Figure 7:
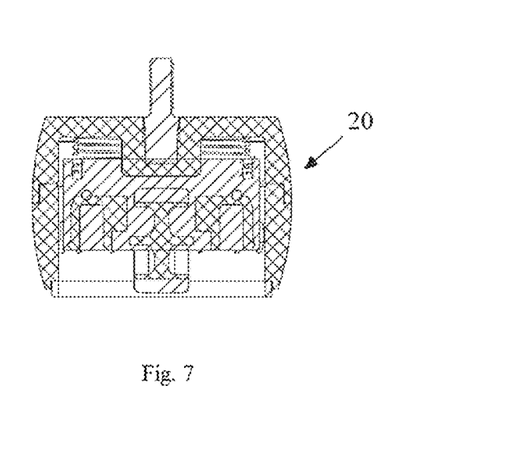
FIG. 7 is a cross-sectional side view taken along line 7-7 in FIG. 6.

The operation of the actuating mechanism is as follows. When toothed rotator 30 moves axially initially relative to said geared housing 60 in a first direction from its at rest, retracted position (FIG. 8A), first set of teeth 66 of geared housing 60 fit in spaces 45 between second set of teeth 40 of toothed rotator 30 enabling saw teeth 69 to engage third set of spaced saw teeth 36 causing toothed rotator 30 to rotate relative to first geared housing 60 (FIG. 8B). When toothed rotator 30 moves axially relative to geared housing 60 in a second opposite direction (down in FIGS. 8A-8C), second set of saw teeth 71 engage between said fourth and fifth sets (42, 44) of saw teeth maintaining relative axial spacing between first geared housing 60 and second toothed rotator 30 in an intermediate locked position. When it is desired to return the actuator to its FIG. 8A retracted position, toothed rotator 30 is subsequently moved axially relative to geared housing 60 in the first axial direction. This causes first set of saw teeth 69 to once again engage third set of spaced saw teeth 36 causing toothed rotator 30 to rotate relative to first geared housing 60 a second time in the first rotational direction, such that when second toothed rotator 30 moves axially in the second opposite axial direction, third set of saw teeth 71 engage said fifth set of saw teeth 44 causing additional rotation of toothed rotator 30 relative to first geared housing 60 allowing first set of gear teeth 66 to slide between second set of teeth 40 returning to said its at rest, retracted position. The movement from intermediate extended position to transient position to retracted position is depicted in FIGS. 2, 3; FIGS. 4, 5; and FIGS. 6, 7; respectively. While actuating mechanism 20 has particular applicability in the arena of retractable caster wheels and slide guides, it will be understood that the mechanism is suitable for use in other applications requiring locking and unlocking actuating mechanisms. Further, it will be understood that the features of this invention are equally demonstrable on devices ranging in size from the diameter of a dime to 6' or more across, without departing from the scope of the invention. In using the actuating mechanism 20 in the furniture glide environment, permanent casters/slides may be placed on the front or back and the retractable caster/glide of the present invention deployed on the front. It is important that a suitable caster housing for the permanent casters/slides be obtained with the set of actuatable casters to ensure proper operation due to height variations which might occur with other hardware that could negatively impact functionality.

Figure 12:
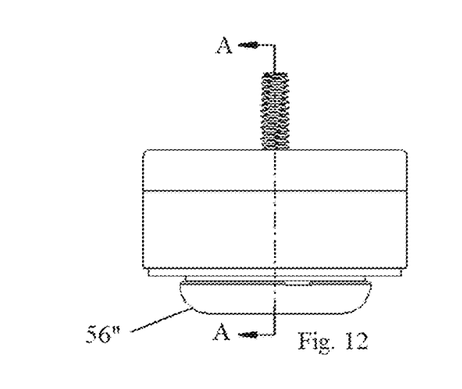
FIG. 12 is a front view of an embodiment depicting a slider in place of the caster.
Figure 12A:
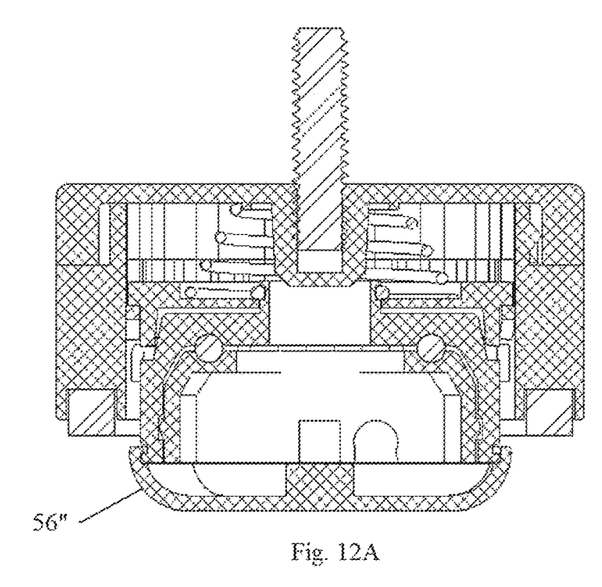
FIG. 12A is a front perspective view of the slider depicted in FIG. 12.
Figure 12B:
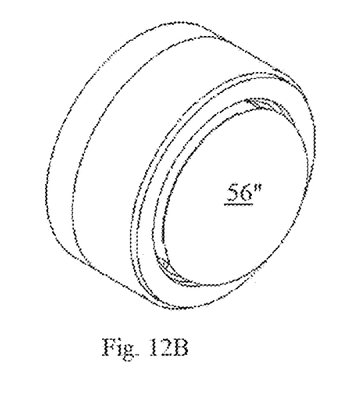
FIG. 12B is a cross-sectional side view of the embodiment shown in FIG. 12.
Figures 13A, 13B:
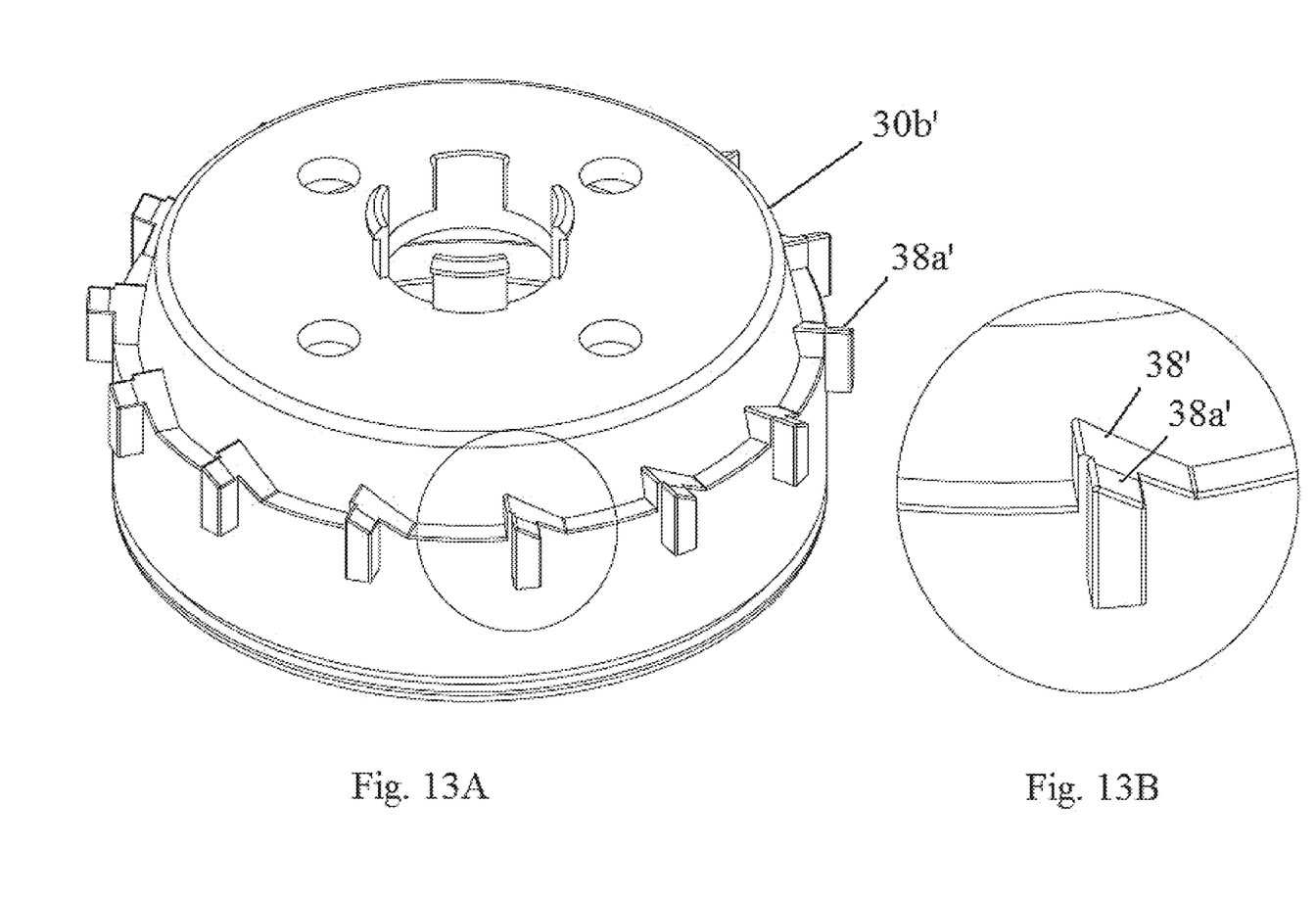
FIG. 13A is an enlarged perspective view of the rotator of the second embodiment of the furniture glide of the present invention.
FIG. 13B is an enlarged detailed view of the circle portion in FIG. 13 embodiment, and, FIG. 13C is an enlarged perspective view of the geared plunger of the second embodiment.
Figure 13C:
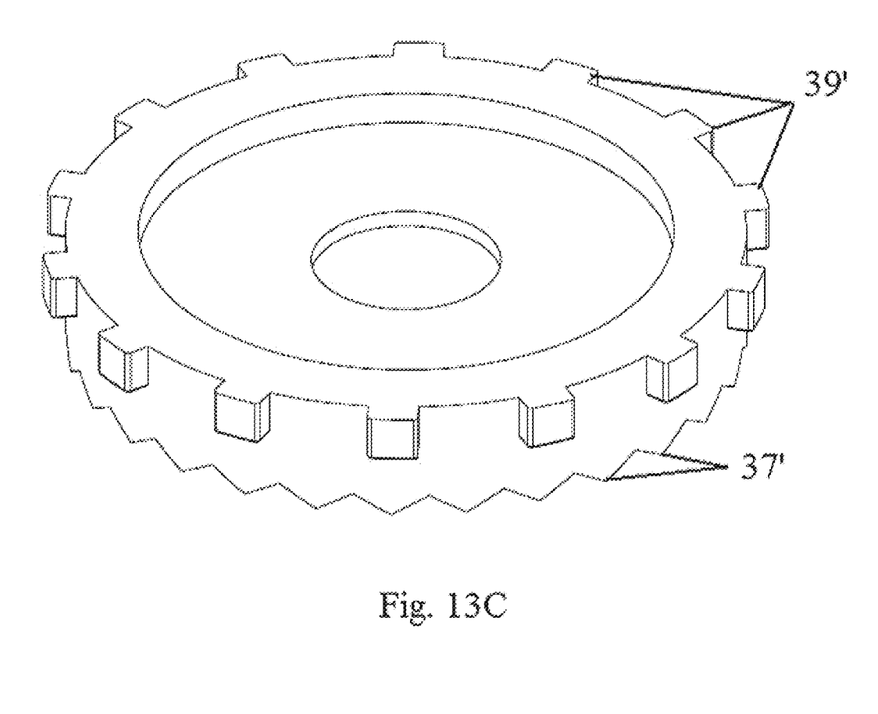

A second embodiment of the furniture glide of the present invention is depicted in FIGS. 10, 11, 13A-13C generally at 20'. This embodiment employs a different style caster wheel 56'. Alternatively, a slide pad 56" of the type shown in FIGS. 12, 12A and 12B may be used. In addition, the function of toothed rotator in the earlier embodiment is shared by plunger 30a' and spinner 30b'. Teeth 39' on plunger 30a' engage in slots 40' and when engaged, lock plunger 30a' and geared housing 60' together. Like elements of this second embodiment have corresponding reference numerals to that of the first embodiment. Second embodiment elements include threaded stud 22', cap 24', conical spring 26', compressible O-ring 27', geared plunger 30a', housing 60' with recess 81' that receives rubber gripping ring 80', toothed rotator 30b', ball bearings 48', wheel housing 50', wheel 56', wheel axle 58', and low-friction slider pad 82'.

The operation of this embodiment is as follows. The conical spring 26' maintains constant downward force against the geared plunger 30a'. The upper protrusions 39' (FIG. 13C) on the geared plunger 30a' ride in corresponding channels 40' in the housing 60' (FIG. 11) providing a longitudinal non-rotative movement, allowing the geared plunger 30a' to travel downward in a smooth and straight manner. The geared plunger 30a' has lower teeth 37' that mesh against corresponding teeth 38' in the angular tooth rotator 30b'. The teeth 38a' on the angular toothed rotator engage teeth 42', 44' in the housing 60' moving between a retracted position and an extended position. Once the angular toothed rotator 30b' travels past and out engagement with the teeth 42', 44' of the housing the lower teeth 37' on the geared plunger 30a' engage teeth 38' to force angular toothed rotator 30a' to spin one tooth rotation. This rotation then aligns the angular tooth rotator teeth 38a' into the next engagement with teeth 42', 44' positioning it in either an extended or retracted state.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. An actuating mechanism having a first position and a second position, said actuating mechanism comprising:
   a) a cylindrical geared housing having a first axis of rotation defining a first axial direction, and a first set of gear teeth on an inner peripheral surface thereof, said first set of gear teeth having a first upper angular surface sloping upwardly in a first lateral direction, a second upper angular surface offset from said first angular surface defining a first series of saw teeth, said second angular surface sloping upwardly in said first lateral direction, and a third lower angular surface sloping downwardly in said first lateral direction defining a second set of saw teeth, each one of said first set of gear teeth having a first lateral dimension;
   b) a toothed rotator having a second axis of rotation which is coaxial with said first axis of rotation, said toothed rotator being rotatable about said second axis in a first rotational direction relative to said geared housing, said first rotational direction being the same as said first axial direction, said toothed rotator having
      i) a first set of teeth along an upper outer periphery, said first set of teeth having a fourth angular surface facing downward and sloping upwardly in said first axial direction, said first set of teeth defining a third set of spaced saw teeth, and ii) a second set of teeth about its outer periphery at its equator, said second set of teeth having a first upper angular surface sloping downwardly in said first axial direction defining a fourth set of saw teeth, a second angular surface offset from said first angular surface defining a fifth set of saw teeth, said second angular surface sloping downwardly in said first axial direction, said second set of teeth being spaced one from another by an amount exceeding said first lateral dimension;

whereby when said toothed rotator moves axially initially relative to said cylindrical geared housing in a first direction from its at-rest, retracted position to a compressed tooth-engaged position, said first set of teeth fit between said second set of teeth enabling said first set of saw teeth to engage said third set of spaced saw teeth causing said toothed rotator to rotate relative to said first geared housing and when said toothed rotator moves axially relative to said geared housing in a second opposite direction, said second set of saw teeth engage between said fourth and fifth sets of saw teeth maintaining relative axial spacing between said first geared housing and said toothed rotator in an intermediate locked position; whereby, when said toothed rotator moves axially subsequently relative to said geared housing in said first direction, said first set of saw teeth once again engage said third set of spaced saw teeth causing said toothed rotator to rotate relative to said first geared housing a second time in said first rotational direction, such that when said toothed rotator moves axially in said second opposite axial direction, said third set of saw teeth engage said fifth set of saw teeth causing additional rotation of said toothed rotator relative to said first geared housing allowing said first set of teeth to slide between said second set of teeth returning to said its at rest, retracted position.

2. The actuating mechanism of claim 1 further comprising
   a) a wheel housing secured with said geared housing;
   b) an axle non-rotatably mounted in recesses in said wheel housing;
   c) a caster wheel rotatably mounted on said axle;
whereby said actuating mechanism moves said caster wheel from a first at-rest, retracted position through a second tooth-engaged position to a third intermediate locked position where said caster wheel supports at least a portion of a weight of an item to which it is attached.

3. A retractable caster comprising:
   a) a cylindrical housing;
   b) a caster wheel having a first at-rest retracted position within said cylindrical housing;
   c) actuator means for moving said caster wheel from said first at-rest retracted position to a second locked position in which said caster wheel protrudes below a bottom of said cylindrical housing and supports at least a portion of a weight of an item to which said retractable caster is attached, wherein said actuator means comprises a toothed rotator which engages teeth on said cylindrical housing causing a first rotation from said first at-rest retracted position through a second tooth-engaged position to a third intermediate locked position where said caster wheel is in a weight-supporting position, operation of said actuator means occurring by unweighting said cylindrical housing.

\* \* \* \* \*